United States Patent [19]  [11] 3,886,234
Ishihara et al.  [45] May 27, 1975

[54] ADHESIVE RESIN COMPOSITIONS AND ADHESIVE FILMS PRODUCED THEREFROM

[75] Inventors: Shigenobu Ishihara; Shoichi Kobayashi, both of Tokyo, Japan

[73] Assignee: Showa Denka Kabushiki Kaisha, Tokyo, Japan

[22] Filed: Apr. 9, 1973

[21] Appl. No.: 349,579

[30] Foreign Application Priority Data
Apr. 8, 1972 Japan............................ 47-34850
Dec. 1, 1972 Japan............................ 47-119786
Dec. 27, 1972 Japan............................ 47-130059

[52] U.S. Cl...... 260/878 R; 260/78.4 D; 260/897 B
[51] Int. Cl. ............................................. C08f 15/00
[58] Field of Search ........ 260/878 R, 897 B, 78.4 D

[56] References Cited
UNITED STATES PATENTS
3,488,306  1/1970  Thormahlen.................. 260/897 B
3,615,106  10/1971  Flanagan et al................ 260/897 B
3,737,483  6/1973  Kosaka et al. ................. 260/878 R
3,749,756  7/1973  Kosaka et al. ................. 260/878 R
3,760,031  9/1973  Sato et al....................... 260/78.4 D
3,784,668  1/1974  Neidinger....................... 260/897 B
3,808,294  4/1974  Sato et al. ..................... 260/897 B

FOREIGN PATENTS OR APPLICATIONS
872,296  6/1971  Canada ......................... 260/897 B Primary Examiner—Joseph L. Schofer
Assistant Examiner—A. Holler
Attorney, Agent, or Firm—Sughrue, Rothwell, Mion, Zinn & Macpeak

[57] ABSTRACT

An adhesive resin composition comprising (A) an ethylenevinyl acetate copolymer or a combination of an ethylene-vinyl acetate copolymer and polyethylene, (B) an unsaturated carboxylic acid, (C) an organic peroxide, and optionally (D) a phenol compound, and adhesive films produced from the adhesive resin composition are disclosed.

36 Claims, 1 Drawing Figure

ADHESIVE RESIN COMPOSITIONS AND ADHESIVE FILMS PRODUCED THEREFROM

BACKGROUND OF THE INVENTION

1. Field of the Invention

This invention relates to a resin composition having excellent adhesiveness. More particularly, it relates to a resin composition having excellent adhesiveness which comprises (A) 100 parts by weight of (1) an ethylene-vinyl acetate copolymer or (2) a combination of an ethylene-vinyl acetate copolymer and polyethylene, the vinyl acetate content in (A) being 1 to 35 percent by weight based on the total weight of (A); (B) 0.05 to 200 parts by weight of unsaturated carboxylic acids which are solid at normal temperature; (C) 0.005 to 10.0 parts by weight of organic peroxides; and, optionally, (D) 0.05 to 5.0 parts by weight of at least one phenol compound selected from the group consisting of monophenol compounds, bisphenol compounds, trisphenol compounds and tetraphenol compounds.

The resin composition according to the present invention can be used as an adhesive for various synthetic resins, rubbery materials, fibrous materials, including paper and wood, and moldings prepared from inorganic compounds. In particular, the resin composition of this invention has been found to be useful for bonding plasticized polyvinyl chloride or polyolefins such as polyethylene and polypropylene which generally exhibit poor adhesiveness to other articles with adhesives commonly used.

2. Description of the Prior Art

Polyolefins such as polyethylene and polypropylene and plasticized polyvinyl chloride are known to have excellent resistance against a wide variety of chemical substances and are now used as numerous moldings in various fields. However, the excellent chemical resistance of these resins presents considerable difficulties in printing or dyeing on the surface of a polyolefin or plasticized polyvinyl chloride moldings such as a film, sheet or vessels, for example, a bottle, or in bonding these moldings to other articles.

Various processes have heretofore been proposed for bonding polyolefin moldings to other articles such as metals, wood, synthetic resins and glass, for example, aa process for activating the surface of polyolefin moldings by subjecting the surface to ionization by γ-ray radiation, ozone oxidation or high temperature treatment (Japanese Patent application Publication No. 11,836/63), a process comprising subjecting polyethylene to thermal degradation and subsequently modifying it with maleic anhydride (Japanese Patent application Publication No. 8,728/69), a process comprising modifying polypropylene with maleic anhydride (Japanese Patent application Publication No. 10,757/67), a process comprising modifying liquid polymers of conjugated diolefins with maleic anhydride (Japanese Patent application Publication No. 21,109/64), a process comprising using a copolymer of ethylene and maleic anhydride or acrylic acid (Japanese Patent application Publication No. 24,341/63 ) and a process comprising using a graft copolymer (Japanese Patent application Publication No. 27,235/70).

These prior art processes in fact improve the adhesiveness of polyolefin moldings to other articles to a certain extent, but they are accompanied with some disadvantages in that polyolefin moldings cannot be rendered fully adhesive; complicated operations are required; plant cost considerably increases; the shapes of articles to be bonded with the polyolefin moldings are limited; and adhesion requires a long period of time.

It has also been desired in a wide variety of fields to develop a method for easily and strongly bonding plasticized polyvinyl chloride resins to other materials, for example, metals, woods and the like in order to not only prevent the corrosion of the metals or woods but also to develop new and useful composite materials for use as architectual, structural, and interior materials in various fields in which the inherent deficiencies of each component of the composite materials are overcome by the other member(s) of the composite material.

SUMMARY OF THE INVENTION

The primary object of this invention is therefore to provide a resin composition having excellent adhesiveness.

Another object of this invention is to provide a resin composition having excellent adhesiveness to various materials such as synthetic resins, rubbery materials, fibrous materials and moldings of inorganic materials, in particular, excellent adhesiveness to moldings of polyolefins such as polyethylene and polypropylene or plasticized polyvinyl chloride.

These and other objects of this invention can be accomplished by a resin composition comprising: (A) an ethylene-vinyl acetate copolymer or a combination of an ethylene-vinyl acetate copolymer and polyethylene; (B) at least one unsaturated carboxylic acid which is solid at normal temperature; (C) organic peroxide; and, optionally, (D) at least one phenol compound.

DETAILED DESCRIPTION OF THE INVENTION

The present inventors searched for a resin composition which bonds moldings of polyolefins or plasticized polyvinyl chloride and other articles easily and strongly and found that a composition comprising: (A) an ethylene-vinyl acetate copolymer or a combination of an ethylene-vinyl acetate copolymer and polyethylene; (B) an unsaturated carboxylic acid; and (C) an organic peroxides exhibits a strong adhesiveness when it is used between polyolefin moldings or plasticized polyvinyl chloride moldings and other articles to be bonded thereto followed by heat pressing.

A resin composition comprising the above three components makes it possible to bond polyolefin or plasticized polyvinyl chloride moldings to other articles without previously activating the suurface of the polyolefin by ionization with γ-radiation, corona discharge, ozone oxidation or high temperature treatments as are usually performed in the prior art.

The ethylene-vinyl acetate copolymer or a combination of the copolymer and polyethylene used in the present invention contains from 1 to 35 percent by weight, preferably from 5 to 30 percent by weight, of vinyl acetate based on the total weight of the copolymer or the combination of the copolymer and polyethylene. Ethylene-vinyl acetate copolymers containing less than 1 percent by weight of vinyl acetate generally result in poor bonding strength of the final resin composition, and copolymers containing vinyl acetate in an amount greater than 35 percent by weight render the final resin composition too soft. These tendencies are also observed in a combination of the ethylene-vinyl acetate copolymer and polyethylene containing less than 1 percent by weight or greater than 35 percent by weight of vinyl acetate based on the total weight of the above combination.

When an ethylene-vinyl acetate copolymer or a combination of an ethylene-vinyl acetate copolymer and polyethylene containing greater than 35 percent by weight of vinyl acetate is used, in particular, when the resin composition is interposed, as described hereinafter in greater detail, in the form of films or sheets between polyolefin or plasticized polyvinyl chloride moldings and other articles to be bonded to the moldings, then superposed films or sheets of the resin composition before interposing will readily be bonded to each other at room temperature, thereby undesirably preventing the operability of bonding polyolefin or plasticized vinyl chloride moldings with other articles. Also, the resulting resin composition will have a poor heat resistance. However, it is to be noted that an ethylene-vinyl acetate copolymer containing greater than 35 percent by weight of vinyl acetate can be used in the present invention if polyethylene is incorporated into the copolymmer so as to adjust the vinyl acetate content in the resulting mixture to a range of from 1 to 35 percent by weight based on the weight of the mixture. In this case, the final resin composition exhibits good adhesiveness without any difficulties as set forth above.

The unsaturated carboxylic acids which can be used in the resin composition of this invention include aliphatic and aromatic unsaturated carboxylic acid which are solid at normal temperature. Unsaturated carboxylic acids which are liquid at normal temperature, for example, acrylic acid or methacrylic acid, are not appropriate because of their unpleasant odor and strong corrosiveness when they are added to the ethylene-vinyl acetate copolymer or a combination of the ethylene-vinyl acetate copolymer and polyethylene using a mixer such as a roll or Banbury mixer. The aliphatic unsaturated carboxylic acids which can be used in the present invention include crotonic acid, maleic acid, fumaric acid, itaconic acid, 2-methylene glutaric acid and citisconic acid. The aromatic unsaturated carboxylic acids which can be used in the present invention include, for example, cinnamic acid. The above described unsaturated carboxylic acids may be used alone or in combinations of two or more acids.

The carboxylic acids used in the present invention are those which are almost not polymerized or not polymerized at all. For instance, even when a mixture of fumaric acid and 5 percent by weight of dicumyl peroxide (DCP) is heated for 7 minutes at a temperature of 165°C, a resulting product is a free flowing powder. Further, the intrinsic viscosity determination using methyl alcohol as a solvent or gel chromatography analysis of the above powder shows that the powder does not contain any high molecular weight products. Also, when a mixture of the ethylene-vinyl acetate copolymer, fumaric acid and dicumyl peroxide is heated for 5 minutes at a temperature of 160°C followed by pulverization and the resulting powder is extracted with methyl alcohol, the fumaric acid can be recovered substantially quantitatively in a non-polymerized form, and the unextracted material shows the same infrared absorption spectrum as that of the ethylene-vinyl acetate copolymer used as a starting material. This clearly indicates that the fumaric acid is not polymerized.

Notwithstanding the above fact, the resin composition of this invention exhibits a strong adhesiveness and adhesiveness of the resin composition is not reduce after storage for long periods of time.

The organic peroxides used in this invention are of the type which is preferably a powder at room temperature and which are generally used as initiators in radical polymerizations. Suitable organic peroxides are those having a decomposition temperature (a 10-hour half life value) of greater than 60°C. Examples of the peroxides which can be used in the present invention include dialkyl peroxides such as dicumyl peroxide; diaryl peroxides such as benzoyl peroxide; and ketone peroxides such as methyl ethyl ketone peroxide and 1,1-bis-tert-butyl peroxy-3,3,5-trimethylcyclohexane; hydroperoxides such as cumene hydroperoxide; and 2,5-dimethyl-2,5-dibenzoyl peroxyhexane. These organic peroxides may be used alone or as combinations of two or more peroxides.

In another embodiment of this invention, the resin composition of this invention can contain 0.05 to 5.0 parts by weight, based on 100 parts by weight of the ethylene-vinyl acetate copolymer, of at least one phenol compound selected from the group consisting of monophenol compounds, bisphenol compounds, trisphenol compounds and tetraphenol compounds.

The resin compositions of this invention comprising (A) an ethylene-vinyl acetate copolymer or a combination of an ethylene-vinyl acetate copolymer and polyethylene; (B) at least one unsaturated carboxylic acid; and (C) at least one organic peroxide, in some cases cannot be extruded when the composition is blended in a mixer such as an extruder, and this effect is particularly noted when blending is for a long period of time.

Also, when the resin composition is fabricated as a film using a T-die or a lay-flat film holder (inflation technique), the resulting film sometimes tends to tear or break during the film formation, whereby film production cannot be efficiently carried out.

The above problems are believed to be caused by a partial cross-linking of the ethylene-vinyl acetate copolymer or the combination of the ethylene-vinyl acetate copolymer and polyethylene with the organic peroxide(s). To eliminate the above problems, organic compounds commonly employed as an anti-oxidant such as amine compounds, for example, phenyl-α-naphthylamine, N,N'-di-β-naphthyl-p-phenylenediamine and the like, sulfide compounds, for example, dilaurylthiodipropionate and the like, and phosphite compounds, for example, triphenylphosphite and the like may be used in the composition in order to inhibit the cross-linking reaction, but these anti-oxidants also markedly reduce the adhesiveness of the resin composition and, therefore, are not desirable.

As a result of intensive researches, it was found that the phenol compounds hereinafter described in greater detail can be incorporated into the resin composition comprising (A) an ethylene-vinyl acetate copolymer or a combination of such a copolymer and polyethylene; (B) at least one unsaturated carboxylic acid and (C) at least one organic peroxide in order to inhibit a cross-linking of the resin composition without adversely affecting the adhesiveness of the resulting resin composition.

It was also found that the above phenol compound makes it easy to blend the resin composition when the resin composition is blended in the molten state since the phenol compound inhibits the cross-linking and, in addition, allows a smooth formation of the film of the resin composition without causing troubles such as breaking or tearing of the molded film.

The phenol compounds which can be used in the resin composition are monophenol compounds, bisphenol compounds, trisphenol compounds and tetraphenol compounds.

Suitable examples of the monophenol compounds include phenol, cresols (o-, m- or p-), xylenols, 2,6-di-tert-butyl-4-methylphenol, 2,6-di-tert-butyl-4-ethylphenol, 2,6-di-tert-butyl-4-methoxyphenol, n-octadecyl-β-(4'-hydroxy-3',5'-di-tert-butylphenyl(propionate, catechol, hydroquinone and the like.

Suitable examples of the bisphenol compounds include 2,2'-methylenebis(4-methyl-6-tert-butylphenol), 4,4'-butylidenebis(3-methyl-6-tert-butylphenol), 4,4'-thiobis(3-methyl-6-tert-butylphenol), 2,2'-thiobis(4-methyl-6-tert-butylphenol), 4,4'-dihydroxyphenylisopropane and the like.

Suitable examples of the trisphenol compounds include 1,3,5-trimethyl-2,4,6-tris(3,5-di-tert-butyl-4-hydroxybenzyl)benzene, 1, and the like.

Suitable examples of the tetraphenol compounds include tetrakis[methylene-3-(3',5'-di-tert-butyl-4'-hydroxyphenyl)propionate]methane and the like.

These phenol compounds can be used alone or as a combination of two or more such compounds.

As described above, the resin composition of this invention comprises (A) an ethylene-vinyl acetate copolymer or a combination of such a copolymer and polyethylene; (B) at least one unsaturated carboxylic acid; (C) at least one organic peroxide and, optionally; (D) at least one phenol compound.

The unsaturated carboxylic acid(s) can be used in a proportion of from 0.05 to 200 parts, preferably from 0.1 to 120 parts, by weight based on 100 parts by weight of the ethylene-vinyl acetate copolymer or a combination of the copolymer and polyethylene. A particulary preferred proportion of the unsaturated carboxylic acids is in the range of from 0.5 to 15 parts by weight. When unsaturated carboxylic acids are used in a proportion lower than 0.05 parts by weight based on 100 parts by weight of the ethylene-vinyl acetate copolymer or a combination of the copolymer and polyethylene, the adhesiveness of the resulting composition is relatively low, and when the unsaturated carboxylic acids are used in a proportion greater than 200 parts by weight, the resin composition tends to become brittle whereby excellent adhesiveness cannot be obtained.

The organic peroxides can be used in a proportion of from 0.005 to 10.0 parts, preferably from 0.05 to 5.0 parts, by weight based on 100 parts by weight of the ethylene-vinyl acetate copolymer or a combination of the copolymer and polyethylene. When the peroxides are used in a proportion greater than 10.0 parts by weight, the final composition does not show an improved adhesiveness and, in addition, the uniformity in the adhesive strength of the final composition is reduced. Further, the handling of the final composition becomes difficult due to a cross-linking of the copolymer which would occur during the blending or storage of the composition.

The phenol compounds can be incorporated in a proportion of from 0.05 to 5.0, preferably from 0.1 to 1.0, parts by weight based on 100 parts by weight of the ethylene-vinyl acetate copolymer or a combination of the above copolymer and polyethylene. When phenol compounds are used in a proportion lower than 0.05 parts by weight based on 100 parts by weight of the copolymer or a combination of the copolymer and polyethylene, the phenol compound does not effectively prevent the cross-linking of the ethylene-vinyl acetate copolymer or a combination of the copolymer and polyethylene caused by the organic peroxide. On the other hand, when the phenol compound is used in a proportion greater than 50 parts by weight it tends to reduce the adhesiveness of the ethylenevinyl acetate copolymer or a combination of the copolymer and polyethylene.

The mixing of the ethylene-vinyl acetate copolymer or a combinaktion of the copolymer and polyethylene, unsaturated carboxylic acids, organic peroxides and phenol compounds, if used, can be effected by the conventional procudures. In particular, mixing is preferably be effected by bringing the above components to a molten state using a mixer such as a hot roll Banbury mixer or an extruder. It is also possible to mix the above components using an appropriate organic solvent, or to effect the mixing by dissolving or suspending the unsaturated carboxylic acids, organic peroxides and phenol compounds in water or an organic solvent and thereafter contacting the resultant solution with the ethylene-vinyl acetate copolymer or a mixture of the copolymer with polyethylene followed by evaporation of water or the organic solvent.

A high mixing temperature gives rise to disadvantages in that not only decomposition of any organic peroxides would lead to the cross-linking of ethylene-vinyl acetate copolymer or the mixture of the copolymer with polyethylene thereby decreasing the wettability of the adhesive composition to an object to be bonded and failing to provide good adhesiveness, but also stirring will have to be stopped during mixing because of the cross-linking of the ethylene-vinyl acetate copolymer or a combination of the copolymer and polyethylene. The mixing is thus preferably carried out at as low a temperature as possible and, as a means for determining the temperature to be used, is conducted at or below the temperature at which the half life value period of the decomposition of the organic peroxide(s) used indicates 1, preferably 10 hours. Namely, it is necessary that the above components be mixed at a temperature at which the decomposition of the organic peroxide(s) does not take place so that peroxide decomposition can occur when the adhesive composition is actually used as an adhesive.

The polyolefins used in this invention include high and low density polyethylene, polypropylene, block copolymer of ethylene and propylene or a rubber-like material comprising ethylene and propylene (EPR), copolymer of ethylene and butene-1, terpolymer of ethylene, propylene and a diene (EPDM) and copolymers mainly consisting of ethylene or propylene and containing small amounts of vinyl compounds such as vinyl acetate, acrylic ester and vinyl chloride.

The above polyolefins may be used alone or as a combination of two or more thereof. Also, mixtures comprising polyolefins and other synthetic resins or rubbery materials can be bonded by the adhesive composition of this invention. Further, the polyolefins may contain additives commonly used such as stabilizers against oxygen, ozone, light (ultraviolet ray) and heat, inhibitors of polyolefin deterioration due to metals, flame retardants, copper inhibitors, workability promoters (for example, plasticizers), reinforcing agents, fillers, coloring agents, colorability promoters, antistatic agents, adhesivity promoters and antiblocking agents. The adhesive composition of this invention is also applicable to polyolefin compositions which are rich in inorganic filler (for example, a composition comprising 30 parts by weight of polyolefin and 70 parts by weight of an inorganic filler).

Further, the polyolefin moldings bonded by the adhesive composition of this invention can be in various forms such as powders, films, sheets, boards, rods, pipes and other articles obtained by injectioon molding and extrusion molding.

The adhesive compositions of this invention can be disposed between polyolefin moldings and other articles either in a solid form itself or in a state previously molded into a film or sheet. However, the molding should be carried out under conditions where the cross-linking of the ethylene-vinyl acetate copolymer or a combination of the copolymer and polyethylene is prevented. Otherwise, the bonding power of the resulting adhesive composition will decrease. Therefore, it is preferred that the molding of the adhesive composition be effected at or below the temperature at which the half life value period of the decomposition of the organic peroxide(s) used indicates 1, preferably 10 hours.

It is also possible to spray or coat a solution or suspension containing the adhesive composition on the surface of polyolefin moldings or other articles or to immerse the polyolefin moldings or other articles in the above solution or suspension.

It is preferred that the adhesive composition be uniformly deposited on the surface of polyolefin moldings or other articles to a degree of from 0.0005 g/cm$^2$ to 1 g/cm$^2$.

Polyolefin moldings and other articles between which the adhesive composition are placed are pressed by, for example, a heating press so as to be bonded together. A heating press roll is preferably used when polyolefin moldings are in the form of films.

Polyolefin moldings and other articles are preferably bonded together at such a temperature higher than that at which the half life value period of the decomposition of organic peroxides used indicates 10, preferably 1 hour, and at least 10°C higher than the melting or softening point of the polyolefin(s). Temperatures at which the polyolefin moldings or other articles are deteriorated or decomposed should not be used. While unduly high temperatures result in the deterioration of polyolefins, it is most preferred that bonding be carried out at as high a temperature as possible so long as deterioration does not take place. A temperature lower than the melting or softening point of the polyolefin(s) or a temperature lower than that at which the half life value period of the decomposition of organic peroxides used indicates 10 hours will not provide a good adhesive strength.

The time required for bonding varies with the types and the proportions of the components of the adhesive composition, the temperature of bonding and the pressure applied to the polyolefin moldings and other articles to be bonded, but generally, a period of from 1 to 10 minutes will be sufficient.

The polyolefin moldings and other articles can generally be bonded simply by heat-pressing, but powders, sheets and boards of polyolefin moldings and other articles are preferably bonded by applying pressure using, for example, a heating press or heating press rolls. The application of pressure enables polyolefins and other articles to be bonded with uniformly increased adhesive strength. The pressure sufficient to this end generally ranges between 1 to 200 Kg/cm$^2$.

In bonding the plasticized polyvinyl chloride resins to other articles by the adhesive composition of this invention, it is necessary that a polyvinyl chloride resin containing less than 15 percent by weight of plasticizers based on the total weight of the vinyl chloride resin be placed between the plasticized polyvinyl chloride to be bonded and the adhesive composition of this invention followed by heat-pressing. It was unexpectedly found that, in the above manner, the plasticized polyvinyl chloride can be strongly bonded to other articles without having a tendency to decrease adhesive strength which might be caused by migration of the plasticizer from the plasticized polyvinyl chloride to be bonded to the interposed vinyl chloride resin.

The plasticized polyvinyl chloride resins which can be bonded by the adhesive composition of this invention include polyvinyl chloride resins or copolymers of vinyl chloride and ethylene, propylene, vinyl acetate, acrylic acid esters or the like containing from 25 to 100 parts by weight of one or more plasticizers based on 100 parts by weight of the polyvinyl chloride resin(s) or copolymer(s) thereof. The above polyvinyl chloride resin(s) or copolymer(s) thereof may contain various additives. Other than the plasticizer, for example, stabilizers, lubricants, fillers, reinforcing agents, coloring agents, flame retardants, ultraviolet ray absorbers, antistatic agents, foaming agents, etc., as are commonly used in vinyl chloride resins.

The plasticizers which can be used for preparing the plasticized polyvinyl chloride resins and interposed polyvinyl chloride resins are those commonly used in the polyvinyl chloride resins and include, for example, linear dibasic acid esters such as dioctyl adipate (DOA), dioctyl sebacate (DOS) and the like, phthalic acid esters such as dibutyl phthalate (DBP), dioctyl phthalate (DOP) and the like, phosphoric acid esters such as tricresyl phosphate (TCP), triphenyl phosphate (TPP) and the like, epoxided vegetable oils and polyester plasticizers.

The polyvinyl chloride resins which are used between the plasticized polyvinyl chloride resins to be bonded and the adhesive composition of this invention are rigid or semi-rigid polyvinyl chloride containing from 0 to 15 percent, preferably 0 to 10 percent, by weight of one or more of the above plasticizers. The resin may contain various stabilizers and other additives as described above. When the amount of plasticizer exceeds 15 percent by weight, satisfactory adhesiveness cannot be obtained.

The rigid or semi-rigid polyvinyl chloride resins can be used in powder form or may be applied as a solution or latex to the plasticized polyvinyl chloride resins followed by drying. However, in a preferred embodiment the rigid or semi-rigid polyvinyl chloride resins are used as a film or sheet.

The plasticized polyvinyl chloride resins and other articles can generally be bonded using the adhesive composition of this invention and the above described rigid or semi-rigid polyvinyl chloride resins by means of a heating press or heating press rolls in the same manner as described for the bonding of polyolefins moldings and other articles. The bonding can effectively be carried out at a temperature in the range of from 90° to 250°C, preferably from 110° to 200°C. At a temperature below 90°C a satisfactory bond strength cannot be obtained, and at a temperature higher than 250°C the materials to be bonded are deteriorated.

The time required for bonding depends upon various factors as described before. Generally, a period of from 1 to 10 minutes will be sufficient.

The plasticized polyvinyl chloride resins and other articles can generally be bonded simply by heat-pressing under the above conditions, but it is preferred to apply pressure by, for example, a heating press or heating press rolls. The application of pressure enables the plasticized polyvinyl chloride and other articles to be bonded with uniformly increased adhesive strength.

Other articles with which polyolefin moldings or plasticized polyvinyl chloride resins can be bonded by the adhesive compositions of this invention include metals such as aluminum, copper, chromium, iron, lead, zinc, tin, nickel, noble metals, and alloys of all of these metals, for example, brass, stainless steel or bronze and silver solder; cellulosic materials such as wood, paper and cotton cloth; synthetic resins such as polyethylene, polypropylene, polyvinyl chloride, polyacrylonitrile, polystyrene, polymethyl methacrylate, acrylonitrile-butadiene-styrene resin (ABS resin), polyamide, phenol resin, urea resin, melamine resin and blends thereof; elastic materials such as polybutadiene rubber, styrene-butadiene rubber (SBR), ethylene-propylene rubber (EPR), ethylene-propylene-diene terpolymer (EPDM), polychloroprene rubber and acrylonitrile-butadiene rubber (NBR); and inorganic materials such as glass and gypsum.

Further, the above materials may take any form such as a powder, film, sheet, foil, pipe, rod, fiber, fabric, etc.

The bonding can be effected without using adhesive compositions commonly used and without subjecting the polyolefins or plasticized polyvinyl chloride resins to pre-treatments such as ionization by γ-rays, corona discharge, ozone oxidation or the application of high temperature. Further, when the adhesive composition according to this invention is used, it is not necessary to conduct the above pre-treatments to such materials.

The present adhesive composition enables polyolefin moldings or plasticized polyvinyl chloride resins and other articles to be bnded easily and with excellent adhesive strength and the adhesive strength of the composition does not be decrease even if it is stored for long periods of time.

This invention is further illustrated by the following examples but they are not to be construed as limiting the present invention.

In the examples, the adhesiveness of samples was determined basically according to the criteria given in ASTM standards D 903–49, i.e., by measuring the peel strength of the sample in a direction of 180° at a tensile rate of 100 mm/minute.

The gel content in adhesive composition was determined by dissolving 1 g of the composition in 100 ml of toluene as a solvent at a temperature of 90°C for 3 hours and filtering the solution while hot through a screen having a 325 mesh size. The undissolved portion on the filter is referred to as the gel content.

EXAMPLE 1

100 parts by weight of an ethylene-vinyl acetate copolymer containing 20 percent by weight of vinyl acetate (manufactured by Japan Polychemical Company under the trade name "Ultrathene UE 631"), 10 parts by weight of fumaric acid and 0.5 parts by weight of dicumyl peroxide were mixed for 5 minutes in a hot roll at a temperature 85°C to prepare an adhesive composition. The resulting composition was then pressed into a film having a thickness of 0.1 mm by a hot press at a temperature of 100°C. The film thus obtained was placed between an aluminum foil having a thickness of 0.1 mm previously degreased with trichloroethylene and a 0.2 mm thick film of high density polyethylene having a high load melt index of 5.1 g/10 min. as (determined under a load of 21.6 Kg and at 190°C) and a density of 0.950 g/cc (manufactured by Japan Olefin Chemical Co. under the trade name "Sholex") to prepare a laminate. The resulting laminate was then pressed for 5 minutes under a gauge pressure of 10 Kg/cm$^2$ using a hot press at a temperature of 160°C. The resulting bonded laminate showed a peel strength of 18.90 Kg/2.5 cm. width.

COMPARATIVE EXAMPLE 1

In the same manner as described in Example 1, a film of the adhesive composition and a bonded laminate were prepared with the exception that fumaric acid was not used in the adhesive composition. The resulting bonded laminate showed a peel strength of 5.10 Kg/2.5 cm. width.

COMPARATIVE EXAMPLE 2

In the same manner as described in Example 1, a film of the adhesive composition and a bonded laminate were prepared with the exception that dicumyl peroxide was not used in the adhesive composition. The resulting bonded laminate showed a peel strength of 5.80 Kg/2.5 cm. width.

EXAMPLE 2

In the same manner as described in Example 1, a film of the adhesive composition and a bonded laminate were prepared with the exception that 2-methylene glutaric acid was used in place of fumaric acid and that pressure was applied to the laminate at a temperature of 190°C. The resulting bonded laminate showed a peel strength of 20.10 Kg/2.5 cm. width.

EXAMPLE 3

100 parts by weight of an ethylene-vinyl acetate copolymer containing 24 percent by weight of vinyl acetate (manufactured by Sumitomo Chemical Company under the trade name "Evatate K2010"), 5 parts by weight of itaconic acid and 1.0 part by weight of 2,5-dimethyl-2,5-dibenzoyl peroxyhexane were mixed for 5 minutes in a hot roll at a temperature of 80°C to prepare an adhesive composition. The resulting composition was then pressed into a film having a thickness of 0.1 mm by a hot press at a temperature of 100°C. The film thus obtained was placed between an aluminum foil having a thickness of 0.1 mm previously degreased with trichloroethylene and a 0.2 mm thick film of crystalline polypropylene having an intrinsic viscosity of 3.3 dl/g in decalin at 135°C (manufactured by Japan Olefin Chemical Company under the trade name "Shoallomer"). The resulting laminate was pressed for 3 minutes under a gauge pressure of 10 Kg/cm² using a hot press at a temperature of 200°C. The bonded laminate thus obtained showed a peel strength of 17.90 Kg/2.5 cm. width.

EXAMPLE 4

An adhesive film having a thickness of 0.1 mm prepared in accordance with the procedure described in Example 1 consisting of ethylene-vinyl acetate copolymer, fumaric acid and dicumyl peroxide was placed on both sides of a 0.2 mm thick film of high density polyethylene having a density of 0.96 g/cc (manufactured by Japan Olefin Chemical Company under the trade name "Sholex") to prepare a laminate comprising adhesive-polyethylene-adhesive layers. A stainless steel sheet (SUS 27) having a thickness of 1 mm previously degreased with trichloroethylene was then placed on one side of the laminate and a 0.1 mm thick aluminum foil previously degreased with trichloroethylene was placed in the other side of the laminate. The resulting laminate (five layers) was then pressed for 5 minutes under a gauge pressure of 10 Kg/cm² using a hot press at a temperature of 190°C. The bonded laminate thus obtained showed a peel strength of 21.30 Kg/2.5 cm. width as determined by a peeling off test of the aluminum foil.

EXAMPLE 5

A bonded laminate was prepared in the same manner as described in Example 4 with the exception that a 0.2 mm thick galvanized iron sheet previously degreased with trichloroethylene was used in place of the stainless steel sheet. The laminate (five layers) thus obtained showed a peel strength of 20.70 Kg/2.5 cm. width.

EXAMPLE 6

A bonded laminate was prepared in the same manner as described in Example 4 with the exception that the polyethylene sheet used in Example 4 was replaced by a sheet having a thickness of 5 mm prepared from a mixture of 30 parts by weight of a medium density polyethylene having a density of 0.935 g/cc (manufactured by Japan Olefin Chemical Company under the trade name "Sholex") and 70 parts by weight of aluminum hydroxide using a hot press and the resulting laminate was pressed at a temperature of 160°C. The bonded laminate thus obtained showed a peel strength of 19.20 Kg/2.5 cm. width.

EXAMPLE 7

25 parts by weight of ethylene-vinyl acetate copolymer containing 45 percent by weight of vinyl acetate (manufactured by Bayer A.G. under the trade name "Levaprene 450"), 75 parts by weight of a low density polyethylene having a melt index of 5.0 g/10 min. (measured under a load of 2.16 Kg and at a temperature of 190°C) and a density of 0.922 g/cc (manufactured by Japan Olefin Chemical Company under the trade name "Sholex"), 5 parts by weight of fumaric acid and 1.0 part by weight of dicumyl peroxide were mixed for 5 minutes in a hot roll at a temperature of 90°C to prepare an adhesive composition. A film having a thickness of 0.2 mm was then prepared from the resulting composition using a hot press at a temperature of 110°C. A bonded laminate was then prepared in the same manner as described in Example 1 using the above prepared film adhesive composition. The bonded laminate thus obtained showed a peel strength of 15.80 Kg/2.5 cm. width.

EXAMPLE 8

In the same manner as described in Example 1, a bonded laminate was prepared with the exception that crotonic acid is used in place of fumaric acid. The resulting bonded laminate showed a peel strength of 12.50 Kg/2.5 cm. width.

COMPARATIVE EXAMPLE 3

In the same manner as described in Example 1, a bonded laminate was prepared with the exception that an ethylene-vinyl acetate copolymer containing 45 percent by weight of vinyl acetate (manufactured by Bayer A.G. under the trade name "Levaprene 450") was used in place of the ethylene-vinyl acetate copolymer used in Example 1 and that mixing was carried out at a temperature of 40°C. The bonded laminate thus obtained showed a peel strength of 9.00 Kg/2.5 cm. width. The films of the adhesive composition were found to be sticky and the operability and handling were extremely poor.

COMPARATIVE EXAMPLE 4

In the same manner as described in Example 1, a bonded laminate was prepared with the exception that the ethylene-vinyl acetate copolymer used in Example 1 was replaced by a low density polyethylene having a melt index of 11.2 g/10 min. (measured under a load of 2.16 Kg and at a temperature of 190°C) and a density of 0.920 g/cc (manufactured by Japan Olefin Chemical Company under the trade name "Sholex") and that mixing was conducted at a temperature of 105°C. The resulting bonded laminate showed a peel strength of 5.20 Kg/2.5 cm. width.

EXAMPLE 9

In the same manner as described in Example 1, a polyethylene film was bonded to an aluminum foil with the exception that an adhesive composition was prepared by mixing 100 parts by weight of an ethylene-vinyl acetate copolymer containing 11 percent by weight of vinyl acetate (manufactured by Sumitomo Chemical Co., Ltd. under the trade name "Evatate D2010"), 5 parts by weight of cinnamic acid and 0.5 parts by weight of 2,5-dimethylhexane-2,5-dihydroperoxide in a hot roll for 3 minutes at a temperature of 90°C. The bonded laminate showed a peel strength of 12.50 Kg/2.5 cm width.

EXAMPLE 10

In the same manner as described in Example 1, a polyethylene film was bonded to an aluminum foil with the exception that an adhesive composition was prepared by mixing 100 parts by weight of the same ethylene-vinyl acetate copolymer as was used in Example 3, 100 parts by weight of fumaric acid and 5 parts by weight of 1,1-bis-tert-butylperoxy-3,3,5-trimethylcyclohexane in a hot roll for 3 minutes at a temperature of 85°C. The resulting bonded laminate thus obtained showed a peel strength of 12.80 Kg/2.5 cm. width.

EXAMPLE 11

The ethylene-vinyl acetate copolymer used in Example 1 was pulverized into a powder in a turbomill. To 100 parts by weight of the resulting powder were then added 2 parts by weight of maleic acid and 0.3 parts by weight of dicumyl peroxide, followed by mixing. Pellets were then prepared from the mixture thus obtained using an extruder having an orifice diameter of 20 mm at a temperature of 90°C. An adhesive film was then prepared from the resulting pellets and the film was placed between a polyethylene film and an aluminum foil as in Example 1. The bonded laminate thus obtained showed a peel strength of 16.80 Kg/2.5 cm. width.

EXAMPLE 12

In the same manner as described in Example 11, a bonded laminate was prepared with the exception that citraconic acid was used in place of maleic acid used in the adhesive composition prepared in Example 11. The bonded laminate thus obtained showed a peel strength of 13.10 Kg/2.5 cm. width.

EXAMPLE 13

10 parts by weight of itaconic acid and 0.5 parts by weight of dicumyl peroxide were dissolved in 100 parts by weight of methyl alcohol. In this solution was immersed a 0.08 mm thick film of the ethylenevinyl acetate copolymer used in Example 1 for 10 seconds at room temperature. The resulting film was dried in air at room temperature for one week and then dried for 10 minutes at a temperature of 50°C. The resulting polyethylene film was then bonded to an aluminum foil in the same manner as described in Example 1 but using the above film adhesive composition. The bonded laminate thus obtained showed a peel strength of 18.30 Kg/2.5 cm. width.

COMPARATIVE EXAMPLE 5

In the same manner as described in Example 13, a bonded laminate was prepared with the exception that acrylic acid was used in place of itaconic acid used in Example 13. The bonded laminate thus obtained showed a peel strength of 6.70 Kg/2.5 cm. width.

EXAMPLE 14

100 parts by weight of the ethylene-vinyl acetate copolymer used in Example 1, 10 parts by weight of crotonic acid and 5.0 parts by weight of dicumyl peroxide were dissolved in 1000 parts by weight of toluene at a temperature of 40°C. In this solution was immersed a high density polyethylene film as used in Example 1 having a thickness of 0.2 mm for 10 minutes. The immersed film was then dried for one hour at a temperature of 50°C. To both sides of the resulting polyethylene film was then bonded an aluminum foil having a thickness of 0.1 mm previously degreased with trichloroethylene. The resulting laminate was pressed for 5 minutes under a gauge pressure of 5 Kg/cm² using a hot press at a temperature of 160°C. The bonded laminate thus obtained showed a peel strength of 10.10 Kg/2.5 cm. width.

COMPARATIVE EXAMPLE 6

In the same manner as described in Example 1, a laminate was prepared with the exception that 20 parts by weight of dicumyl peroxide was used in place of 0.5 parts by weight of dicumyl peroxide used in Example 1. The bonded laminate thus obtained showed a peel strength of 5.70 Kg/2.5 cm. width, indicating that the bonding was not uniform.

EXAMPLE 15

100 parts by weight of an ethylene-vinyl acetate copolymer containing 24 percent by weight of vinyl acetate (manufactured by Sumitomo Chemical Co., Ltd. under the trane name "Evatate K 2010"), 10 parts by weight of 2-methyleneglutaric acid, 0.4 parts by weight of tertbutylperoxystearate and 0.3 parts by weight of 2,6-di-tert-butyl-4-methoxyphenol were mixed for 5 minutes in a hot roll at a temperature of 80°C (roll surface temperature) to prepare an adhesive composition. The resulting composition was then pressed into a film having a thickness of 0.2 mm by a hot press at a temperature of 90°C under a pressure of 100 Kg/cm². The film thus obtained was then placed between an aluminum foil having a thickness of 0.1 mm previously degreased with trichloroethylene and a 1 mm thick sheet of a high density polyethylene having a density of 0.96 g/cc and a high load melt index of 0.6 g/10 minutes determined under a load of 21.6 Kg at a temperature of 190°C (manufactured by Japan Olefin Chemical Company under the trade name "Sholex") to prepare a laminate. The resulting laminate was then pressed for 5 minutes under a gauge pressure of 10 KG/cm² using a hot press at a temperature of 160°C. The resulting bonded laminate showed a peel strength of 19.2 Kg/2.5 cm. width. The above adhesive composition was heated at a temperature of 130°C for 24 hours and then extracted with toluene. The gel content in the extract was found to be less than 1 percent by weight.

EXAMPLE 16

In the same manner as described in Example 15, a film of the adhesive composition was prepared but without using 2,6-di-tert-butyl-4-methoxyphenol in the adhesive composition. The resulting adhesive film was then placed between the aluminum foil and the high density polyethylene sheet and the laminate was pressed according to the procedure described in Example 15 to prepare a bonded laminate. The resulting bonded laminate showed a peel strength of 18.5 Kg/2.5 cm. width.

The above adhesive composition was heated and extracted with toluene in the same manner as described in Example 15. The gel content in the extract was found to be 57 percent.

EXAMPLE 17

A mixture consisting of 100 parts by weight of an ethylenevinyl acetate copolymer containing 20% by weight of vinyl acetate (manufactured by Japan Polychemical Co., Ltd. under the trade name, "Ultrathene UE 631"), 3 parts by weight of fumaric acid, 0.3 parts by weight of dicumyl peroxide and 0.3 parts by weight of 2,6-di-tert-butyl-4-methylphenol was extruded through an extruder having an orifice diameter of 40 mm at a temperature of 95°C while blending to prepare pellet. An adhesive film having a thickness of 150 microns was then prepared from the resulting pellets using a T-die adjusted to a temperature of 115°C. In this case, no problems such as breaking of the film even when film formation was conducted continuously for a period of 3 hours were encountered. In the same manner as described in Example 15, the film obtained above was placed between the aluminum foil and the high density polyethylene sheet, and the resulting laminate was heat-pressed. The laminate thus obtained showed a peel strength of 21.5 Kg/2.5 cm. width.

EXAMPLE 18

Pellets were prepared in the same manner as described in Example 17 but without using 2,6-di-tert-butyl-4-methylphenol in the adhesive composition. An adhesive film having a thickness of 150 microns was then prepared from the resulting pellets in the same manner as described in Example 17, but the film broke 30 minutes after the commencement of the film formation and the film formation could not be conducted continuously. The film thus obtained was then placed between the aluminum foil and the high density polyethylene sheet as used in Example 15 and the laminate was heat-pressed according to the procedure described in Example 15 to prepare a laminate. The resulting laminate showed a peel strength of 20.7 Kg/2.5 cm. width.

EXAMPLE 19

Pellets were prepared in the same manner as described in Example 17 but using 5 parts by weight of itaconic acid in place of fumaric acid. An adhesive film having a thickenss of 150 microns was then prepared from the resulting pellets in the same manner as described in Example 17. In this case, film could be formed continuously without breaking of the film. The resulting film was then placed between the aluminum foil and the high density polyethylene sheet as used in Example 15 and the laminate thus obtained was pressed in accordance with the procedure described in Example 15 to prepare a bonded laminate. The bonded laminate showed a peel strength of 19.3 Kg/2.5 cm. width.

EXAMPLE 20

Pellets were prepared in the same manner as described in Example 19 using the same extruder with the exception that 0.5 parts by weight of phenol was used in place of 2,6-di-tert-butyl-4-methylphenol while mixing at a temperature of 95°C. The resulting pellets were then pressed into a film having a thickness of 0.2 mm using a hot press under a pressure of 100 Kg/cm² in the same manner as described in Example 15, and the film thus obtained was placed between an aluminum foil having a thickness of 0.1 mm previously degreased with trichloroethylene and a 1.0 mm thick sheet of crystalline polypropylene having an intrinsic viscosity of 3.3 dl/g in decalin (manufactured by Showa Yuka under the trade name "Shoallomer"). The resulting laminate was pressed at a temperature of 200°C under a gauge pressure of 10 Kg/cm² for 3 minutes using a hot press to prepare a bonded laminate. The bonded laminate thus obtained showed a peel strength of 17.9 Kg/2.5 cm. width.

Figure 1:
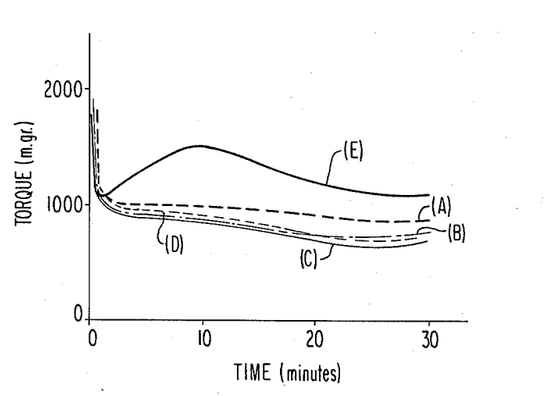
FIGURE illustrates the graphs showing changes in torque as determined by the Brabender-Plastograph in various pellets of the adhesive composition of this invention.

The variation in torque of the above pellets was then determined using a Brabender-Plastograph at a temperature of 170°C. The result obtained is shown in FIG. 1 (A).

The pellets which had been subjected to the torque test were then extracted with toluene for 3 hours at a temperature of 90°C and the gel content in th toluene extract was found to be 1.5 percent.

EXAMPLE 21

Pellets were prepared in the same manner as described in Example 20 using the same extruder with the exeption that 2,2'-methylenebis(4-methyl-6-tert-butylphenol) was used in place of phenol. The resulting pellets were then pressed into a film using a hot press in the same manner as described in Example 20, and the film thus obtained was placed between the aluminum foil and the crystalline polypropylene sheet as used in Example 20. The resulting laminate was pressed using a hot press to prepare a bonded laminate. The bonded laminate thus obtained showed a peel strength of 18.0 Kg/2.5 cm. width.

The variation in torque of the above pellets was then determined using a Brabender-Plastograph at a temperature of 170°C. The result obtained is shown in FIG. 1 (B).

The pellets which had been subjected to the torque test were then extracted with toluene for 3 hours at a temperature of 90°C and the gel content in the toluene extract was found to be 0.7 percent.

EXAMPLE 22

Pellets were prepared in the same manner as described in Example 20 using the same extruder with the exception that 4,4'-thiobis(4-methyl-6-tert-butylphenol) was used in place of phenol. The resulting pellets were then pressed into a film using a hot press in the same manner as described in Example 20, and the film thus obtained was placed between the aluminum foil and the crystalline polypropylene sheet as used in Example 20. The resulting laminate was pressed using a hot press to prepare a bonded laminate. The bonded laminate thus obtained showed a peel strength of 17.2 Kg/2.5 cm. width.

The variation in torque of the above pellets was then determined using a Barbender-Plastograph at a temperature of 170°C. The result obtained is shown in FIG. 1 (C).

The pellets which had been subjected to the torque test were then extracted with toluene for 3 hours at a temperature of 90°C and the gel content in the toluene extract was found to be 0.2 percent.

EXAMPLE 23

Pellets were prepared in the same manner as described in Example 20 using the same extruder with the exception that 1,3,5-trimethyl-2,4,6-tris(3,5-di-tert-butyl-4-hydroxybenzyl)benzene was used in place of phenol. The resulting pellets were then pressed into a film using a hot press in the same manner as described in Example 20, and the film thus obtained was placed between the aluminum foil and the crystalline polypropylene sheet as used in Example 20. The resulting laminate was pressed using a hot press to prepare a bonded laminate. The bonded laminate thus obtained showed a peel strength of 16.9 Kg/2.5 cm. width.

The variation in torque of the above pellets was then determined using a Brabender-Plastograph at a temperature of 170°C. The result obtained is shown in FIG. 1 (D).

The pellets which had been subjected to the torque test were then extracted with toluene for 3 hours at a temperature of 90°C and the gel content in the toluene extract was found to be 0.4 percent.

EXAMPLE 24

Pellets were prepared in the same manner as described in Example 20 using the same extruder with the exception that phenol was not used in the adhesive composition. The resulting pellets were then pressed into a film using a hot press in the same manner as described in Example 20, and the film thus obtained was placed between the aluminum foil and the crystalline polypropylene sheet as used in Example 20. The resulting laminate was pressed using a hot press to prepare a bonded laminate. The bonded laminate thus obtained showed a peel strength of 17.7 Kg/2.5 cm. width.

The variation in torque of the above pellets was then determined using a Brabender-Plastograph at a temperature of 170°C. The pellets which had been subjected to the torque test were then extracted with toluene for 3 hours at a temperature of 90°C and the gel content in the toluene extract was found to be 42.1 percent.

EXAMPLE 25

In the same manner as described in Example 15, an adhesive film was prepared from the adhesive composition with the exception that 5 parts by weight of crotonic acid was used in the composition in place of 2-methylene glutaric acid. The resulting film was then placed between the aluminum foil and the high density polyethylene sheet and the laminate thus obtained was pressed by a hot press in the same manner as described in Example 15 to prepare a bonded laminate. The bonded laminate thus obtained showed a peel strength of 17.7 Kg/2.5 cm. width. Also, in the same manner as described in Example 15, the above adhesive composition was heated and extracted with toluene. The gel content in the toluene extract was found to be 0.3 percent.

EXAMPLE 26

Pellets were prepared in the same manner as described in Example 17 using the same extruder with the exception that the porportion of fumaric acid was changed to 1 part by weight. The resulting pellets were then molded into a film using a T-die in the same manner as described in Example 17. In this case, the film could be produced continuously without breaking of the film. The film thus obtained was then placed between the aluminum foil and the high density polyethylene sheet and the resulting laminate was pressed using a hot press to prepare a bonded laminate. The bonded laminate thus obtained showed a peel strength of 21.1 Kg/2.5 cm. width.

EXAMPLE 27

Pellets were prepared in the same manner as described in Example 17 using the same extruder with the exception that the proportion of fumaric acid was changed to 40 parts by weight. The resulting pellets were then molded into a film using a T-die in the same manner as described in Example 17. In the case, the film could be produced continuously without any breaking of the film. The film thus obtained was then placed between the aluminum foil and the high density polyethylene sheet as those used in Example 17 and the resulting laminate was pressed using a hot press to prepare a bonded laminate. The bonded laminate thus obtained showed a peel strength of 20.7 Kg/2.5 cm. width.

EXAMPLE 28

An adhesive film was prepared from the same adhesive composition as that described in Example 15 with the exception that 3 parts by weight of maleic acid was used in the adhesive composition in place of 2-methylene glutaric acid. The resulting film was then placed between the aluminum foil and the high density polyethylene sheet as used in Example 15, and the resulting laminate was pressed using a hot press to prepare a bonded laminate. The bonded laminate thus obtained showed a peel strength of 20.8 Kg/2.5 cm. width. Also, in the same manner as described in Example 15, the above adhesive composition was heated and extracted with toluene. The gel content in the toluene extract was found to be 0.4 percent.

EXAMPLE 29

An adhesive film was prepared from the same adhesive composition as described in Example 15 with the exception that dicumyl peroxide was used in the adhesive composition in place of the tertbutylperoxystearate used in Example 28. The resulting film was then placed between the aluminum foil and the high density polyethylene sheet as used in Example 15, and the resulting laminate was pressed using a hot press to prepare a bonded laminate. The bonded laminate thus obtained showed a peel strength of 21.3 Kg/2.5 cm. width. Also, in the same manner as described in Example 15, the above adhesive composition was heated and extracted with toluene. The gel content in the toluene extract was found to be 0.4 percent.

EXAMPLE 30

An adhesive film was prepared from the same adhesive composition as that described in Example 29 with the exception that citraconic acid was used in the adhesive composition in place of maleic acid used in Example 29. The resulting film was then placed between the aluminum foil and the high density polyethylene sheet as used in Example 15, and the resulting laminate was pressed using a hot press to prepare a bonded laminate. The bonded laminate thus obtained showed a peel strength of 18.8 Kg/2.5 cm. width. Also, in the same manner as described in Example 15, the above adhesive composition was heated and extracted with toluene. The gel content in the toluene extract was found to be 0.5 percent.

EXAMPLE 31

An adhesive film was prepared from the same adhesive composition as that described in Example 15 with the exception that 2,5-dimethylhexane-2,5-dihydroperoxide was used in the adhesive composition in place of tert-butylperoxystearate. The resulting film was then placed between the aluminum foil and the high density polyethylene sheet as used in Example 15, and the resulting laminate was pressed using a hot press to prepare a bonded laminate. The bonded laminate thus obtained showed a peel strength of 17.6 Kg/2.5 cm. width. Also, in the same manner as described in Example 15, the above adhesive composition was heated and extracted with toluene. The gel content in the toluene extract was found to be 0.7 percent.

EXAMPLE 32

An adhesive film was prepared from the same adhesive composition as that described in Example 15 with the exception that catechol was used in the adhesive composition in place of 2,6-ditert-butyl-4-methoxyphenol. The resulting film was then placed between the aluminum foil and the high density polyethylene sheet as used in Example 15, and the resulting laminate was pressed using a hot press to prepare a bonded laminate. The bonded laminate thus obtained showed a peel strength of 16.9 Kg/2.5 cm. width.

EXAMPLE 33

A bonded laminate was prepared from the same adhesive film and the aluminum foil as described in Example 15 with the exception that a sheet having a thickness of 5 mm prepared by a hot press from a mixture of 30 parts by weight of a medium density polyethylene having a density of 0.935 g/cc and a melt index of 2.0 g/10 minutes (at 190°C and under a load of 2.16 Kg) (manufactured by Japan Olefin Chemical Co., Ltd. under the trade name "Sholex") and 70 parts by weight of alumina trihydrate having a gibbsite crystalline structure was used in place of the high density polyethylene sheet. The resutling laminate was pressed using a hot press to prepare a bonded laminate. The bonded laminate thus obtained showed a peel strength of 21.5 Kg/2.5 cm. width.

EXAMPLE 34

An adhesive film having a thickness of 150 microns prepared as in Example 17 was placed on both sides of a 1.0 mm thick sheet of a high density polyethylene having a density of 0.96 g/cc, a melt index of 0.6 g/cc as measured at a temperature of 190°C and under a load of 2.16 Kg (manufactured by Japan Olefin Chemical Co., Ltd. under the trade name "Sholex") to prepare a laminate (Adhesive-polyethylene-adhesive). A 1 mm stainless steel plate (SUS 27) previously degreased with trichloroethylene was then placed on one side of the laminate and a 0.1 mm thick aluminum foil previously degreased with trichloroethylene was placed on the other side of the laminate to prepare a five-layer laminate. The laminate thus obtained was heat-pressed at a temperature of 180°C under a gauge pressure of 10 Kg/cm$^2$ for 3 minutes. The bonded laminate thus obtained showed a peel strength of 21.9 Kg/2.5 cm. width as determined by peeling the aluminum foil.

EXAMPLE 35

In the same manner as described in Example 34, a bonded laminate was prepared by a hot press using an adhesive film (150 microns in thickness) prepared as in Example 17 with the exception that a galvanized steel sheet having a thickness of 0.2 mm previously degreased with trichloroethylene was used in placed of the stainless steel plate used in Example 34. The bonded laminate thus obtained showed a peel strength of 19.8 Kg/2.5 cm. wdith.

EXAMPLE 36

40 parts by weight of an ethylene-vinyl acetate copolymer containing 45 percent by weight of vinyl acetate (manufactured by Bayer A.G. under the trade name "Levaprene 450"), 60 parts by weight of a low density polyethylene having a density of 0.922 g/cc and a melt index of 5.0 g/10 minutes as measured at a temperature of 190°C under a load of 2.16 Kg (manufactured by Japan Olefin Chemical Co., Ltd. under the trade name "Sholex"), 10 parts by weight of fumaric acid, 0.2 parts by weight of 2,5-dimethyl-2,5-dibenzoyl-peroxyhexane and 1.0 part by weight of o-cresol were mixed in a hot roll having a roll surface temperature of 80°C for 5 minutes. The mixture was then heat-pressed by a hot press at a temperature of 90°C under a gauge pressure of 100 Kg/cm$^2$ to prepare an adhesive film having a thickness of 0.2 mm. In the same manner as described in Example 15, the film thus obtained was placed between the high density polyethylene sheet and the aluminum foil as used in Example 15 and the resulting laminate was heat-pressed by a hot press to prepare a bonded laminate. The bonded laminate thus obtained showed a peel strength of 14.2 Kg/2.5 cm. width. The above mixture was heated at a temperature of 150°C for 5 hours and extracted with toluene. The gel content in the extract was found to be less than 1 percent.

EXAMPLE 37

An adhesive film was prepared in the same manner as described in EXAMPLE 15 by mixing 100 parts by weight of an ethylenevinyl acetate copolymer (manufactured by Toyo Soda Co., Ltd. under the trade name "Ultrathene UE 631"), 3 parts by weight of fumaric acid, 0.3 parts by weight of dicumyl peroxide and 0.3 parts by weight of tetrakis [methylene-3-(3',5'-di-tert-butyl-4'-hydroxyphenyl)-propionate]methane (manufactured by Ciba-Geigy Co. under the trade name "Irganox 1010"). The resulting adhesive film was then placed between the aluminum foil and the high density polyethylene sheet as those used in Example 15 and the resulting laminate was heat-pressed to prepare a bonded laminate. The bonded laminate thus obtained showed a peel strength of 20.5 Kg/2.5 cm. width. The above mixture was heated at a temperature of 130°C for 24 hours and extracted with toluene. The extract was found to contain no gel content (undissolved substances).

Comparative Example 7

An adhesive film was prepared from the same adhesive composition as that described in Example 15 with the exception that an equal amount of N,N'-di-β-naphthyl-p-phenylenediamine (manufactured by Sumitomo Chemical Co., Ltd. under the trade name "Antigen F") was used in the adhesive composition in place of the tetrakis[methylene-3-(3',5'-di-tert-butyl-4'-hydroxyphenol)propionate]methane used in Example 37. The resulting film was then placed between the aluminum foil and the high density polyethylene sheet as used in Example 15, and the resulting laminate was pressed using a hot press to prepare a bonded laminate. The bonded laminate thus obtained showed a peel strength of 8.1 Kg/2.5 cm. width. Also, in the same manner as described in Example 37, the above adhesive composition was heated and extracted with toluene. The gel content in the toluene extract was found to be 0.5 percent.

Comparative Example 8

An adhesive film was prepared from the same adhesive composition as described in Example 15 with the exception that an equal amount of dilaurylthiopropionate (manufactured by Yoshitomi Pharmaceutical Ind., Ltd. under the trade name "DLTP" was used in the adhesive composition in place of the tetrakis [methylene--(3',5'-di-tert-butyl-4'-hydroxyphenyl)propionate]mathane used in Example 37. The resulting film was then placed between the aluminum foil and the high density polyethylene sheet as used in Example 15, and the resulting laminate was pressed using a hot press to prepare a bonded laminate. The bonded laminate thus obtained showed a peel strength of 7.8 Kg/2.5 cm. width. Also, in the same manner as described in Example 37, the above adhesive composition was heated and extracted with toluene. The gel content in the toluene extract was found to be 0.6 percent.

EXAMPLE 38

An adhesive film was prepared from the same adhesive composition as described in Example 15 following the procedure of Example 37 with the exception that an equal amount of n-octadecyl-β-(4'-hydroxy-3',5'-di-tert-butylphenyl)propionate (manufactured by Ciba-Geigy under the trade name "Irganox 1076") was used in the adhesive composition in place of the tetrakis [methylene-3-(3',5'-di-tert-butyl-4'-hydroxyphenyl)propionate]methane used in Example 37. The resulting film was then placed between the aluminum foil and the high density polyethylene sheet as used in Example 15, and the resulting laminate was pressed using a hot press to prepare a bonded laminate. The bonded laminate thus obtained showed a peel strength of 19.4 Kg/2.5 cm. width. Also, the above mixture was heated at a temperature of 130°C for 24 hours and extracted with toluene. The extract was found to contain no gel content.

Comparative Example 9

An adhesive film was prepared from the same adhesive composition as used in Example 15 with the exception that an ethylenevinyl acetate copolymer containing 45 percent by weight of vinyl acetate (manufactured by Bayer A.G. under a trade name "Levaprene 450") was used in place of the ethylene-vinyl acetate copolymer used in Example 15 and that the mixing was carried out at a temperature of 40°C (because the mixture was sticky at 90°C.) The resulting film was then placed between the aluminum foil and the high density polyethylene sheet as those used in Example 15 and the laminate was heat-pressed by a hot press to prepare a bonded laminate. The bonded laminate thus obtained showed a peel strength of 17.0 Kg/2.5 cm. width, but the film was found to be sticky and the handling and operability were extremely poor.

Comparative Example 10

An adhesive film was prepared from the same adhesive composition as in Example 15 with the exception that the proportion of tert-butylperoxystearate used in Example 15 was changed to 15 parts by weight. The resulting film was then placed between the aluminum foil and the high density polyethylene sheet as used in Example 15, and the resulting laminate was pressed using a hot press to prepare a bonded laminate. The bonded laminate thus obtained showed a peel strength of 11.2 Kg/2.5 cm. width. The above adhesive composition was heated at a temperature of 130°C for 24 hours and extracted with toluene. In this case, almost no soluble portion was observed in the extraction, indicating that most of the heated adhesive composition comprises a gel.

Comparative Example 11

An adhesive film was prepared from the same adhesive composition as in Example 15 with the exception that the proportion of 2,6-di-tert-butyl-4-methoxyphenol was changed to 8 parts by weight. The resulting film was then placed between the aluminum foil and the high density polyethylene sheet as those used in Example 15, and the resulting laminate was pressed using a hot press to prepare a bonded laminate. The bonded laminate thus obtained showed a peel strength of 5.7 Kg/2.5 cm. width.

EXAMPLE 39

Two aluminum foils used in Example 15 were placed on both sides of the adhesive film prepared as in Example 15 and the resulting laminate was heat-pressed according to the procedure described in Example 15 by a hot press to prepare a bonded laminate. The bonded laminate was then subjected to a peeling test but the peel strength could not be determined due to breaking of the aluminum foils.

EXAMPLE 40

The adhesive film prepared in Example 15 was placed between the aluminum foil used in Example 15 and the galvanized steel sheet used in Example 35, and the resulting laminate was heat-pressed according to the procedure described in Example 15 to prepare a bonded laminate. The bonded laminate thus obtained showed a peel strength of 25.3 Kg/2.5 cm. width.

EXAMPLE 41

The following additives were blended into 100 parts by weight of a polyvinyl chloride resin (Trade Name: Zeon 103 EP; polymerization degree, 1050) by a hot roll at a temperature of 160°C to prepare a plasticized polyvinyl chloride resin.

|  | Parts by Weight |
| --- | --- |
| Dioctyl phthalate (DOP) | 25 |
| Tricresyl phosphate (TCP) | 15 |
| Epoxy plasticizer | 5 |
| Ba·Cd Composite stabilizer | 3 |
| Epoxy chelator | 2 |
| Precipitated calcium carbonate (particle size, 40 μ) | 40 |

The above plasticized polyvinyl chloride resin was then pressed by a hot press to prepare a sheet having a thickness of 0.3 mm. A biaxially stretched film (0.1 mm in thickness) prepared from a semi-rigid vinyl chloride resin containing 5 percent dioctyl phthalate was then placed on both sides of the above sheet to prepare a three-layer laminate. Two 80 μ thick films of an ethylenevinyl acetate copolymer (Trade Name, Ultrathene UE 631) containing 3 phr. of fumaric acid and 0.3 phr., respectively, of dicumyl peroxide were then placed on both sides of the above-prepared three-layer laminate which was then further provided on each side with an aluminum foil having a thickness of 0.1 mm previously degreased with trichloroethylene. The resulting laminate was pressed by a hot press having a temperature of 160°C for 5 minutes. The bonded laminate thus obtained showed a peel strength of 10.4 Kg/2.5 cm. width.

EXAMPLE 42

A bonded laminate was prepared in the same manner as described in Example 41 with the exception that a steel plate having a thickness of 0.5 mm previously subjected to a phosphate treatment was used in place of one of the aluminum foils used in Example 41. The bonded laminate thus obtained showed a peel strength of 10.9 Kg/2.5 cm. width.

The bonded laminate prepared above was allowed to stand for one week in a dryer having a temperature of 60°C and thereafter the adhesiveness of the laminate was determined. The laminate showed a peel strength of 10.7 Kg/2.5 cm. width, indicating that no substantial changes in the adhesive strength were noted even after the laminate was maintained at 60°C for 1 week.

Comparative Example 12

An aluminum foil was bonded to the plasticized polyvinyl chloride film as described in Example 41 with the exception that the biaxially stretched film of the semi-rigid polyvinyl chloride resin used in Example 41 was omitted. The bonded laminate thus obtained showed a peel strength of 0.5 Kg/2.5 cm. width.

EXAMPLE 43

The following additives were blended into 100 parts by weight of a polyvinyl chloride resin (Trade Name: Zeone 103 EP-J; polymerization degree, 1000; vinyl acetate content, 3 percent) by a hot roll at a temperature of 160°C to prepare a plasticized polyvinyl chloride resin.

|  | Parts by Weight |
|---|---|
| Dibutyl phthalate (DBP) | 20 |
| Dioctyl adipate (DOA) | 15 |
| Dibutyl tin maleate | 2 |
| Chrome Yellow | 1 |

The above plasticized polyvinyl chloride resin was then pressed by a hot press to prepare a sheet having a thickness of 0.3 mm. A 50 µthick film of a rigid polyvinyl chloride resin containing no plasticizers was then placed on one side of the above sheet to prepare a two-layer laminate, and a 0.15 mm thick adhesive film comprising an ethylene-vinyl acetate copolymer (Trade Name: Evatate K2010) containing 10 phr. of 2-methylene glutaric acid and 0.4 phr. of tert-butylperoxy stearate was placed on the film of rigid polyvinyl chloride in the above two-layer laminate. A wood board was then placed on the adhesive film of the laminate and the resulting laminate was pressed for 3 minutes by a hot press having a temperature of 140°C. The bonded laminate thus obtained was found to be difficult to peel off by hand due to its extremely strong adhesion.

EXAMPLE 44

A bonded laminate was prepared in the same manner as described in Example 43 with the exception that a glass plate was used in place of the wood board. The bonded laminate thus obtained was found to be difficult to peel off by hand due to its extremely strong adhesion.

Comparative Example 13

A plasticized vinyl chloride resin was bonded to a glass plate in the same manner as described in Example 44 with the exception that the rigid polyvinyl chloride resin film used in Example 43 was omitted. The plasticized vinyl chloride resin sheet was easily peeled off by hand from the bonded laminate.

While the invention has been described in detail and with reference to specific embodiments thereof, it will be apparent to one skilled in the art that various changes and modifications can be made therein without departing from the spirit and scope thereof.

What is claimed is:

1. An adhesive composition consisting essentially of (A) 100 parts by weight of (1) an ethylene-vinyl acetate copolymer or (2) a combination of an ethylene-vinyl acetate copolymer and polyethylene, the vinyl acetate content in (A) being 1 to 35 percent by weight based on the total weight of said copolymer or said combination of the copolymer and polyethylene, (B) 0.05 to 200 parts by weight of at least one unsaturated carboxylic acid which is solid at normal temperature, (C) 0.005 to 10.0 parts by weight of at least one organic peroxide having a decomposition temperature as determined by 10 hour half life of greater than 60°C.

2. An adhesive composition according to claim 1 wherein the unsaturated carboxylic acid is an aliphatic unsaturated carboxylic acid.

3. An adhesive composition according to claim 1 wherein the unsaturated carboxylic acid is an aromatic unsaturated carboxylic acid.

4. An adhesive composition according to claim 2 wherein the aliphatic unsaturated carboxylic acid is a member selected from the group consisting of crotonic acid, maleic acid, fumaric acid, itaconic acid, 2-methylene glutaric acid, citraconic acid and a mixture thereof.

5. An adhesive composition according to claim 3 wherein at least one aromatic unsaturated carboxylic acid is cinnamic acid.

6. An adhesive composition according to claim 1 wherein at least one organic peroxide is a dialkyl peroxide.

7. An adhesive composition according to claim 1 wherein at least one organic peroxide is a diaryl peroxide.

8. An adhesive composition according to claim 1 wherein at least one organic peroxide is a ketone peroxide.

9. An adhesive composition according to claim 1 wherein at least one organic peroxide is a hydroperoxide.

10. An adhesive composition according to claim 6 wherein at least one dialkyl peroxide is dicumyl peroxide.

11. An adhesive composition according to claim 7 wherein at least one diaryl peroxide is benzoyl peroxide.

12. An adhesive composition according to claim 8 wherein the ketone peroxide is at least one member selected from the group consisting of methyl ethyl ketone peroxide and 1,1-bis-tert-butyl peroxy-3,3,5-trimethyl-cyclohexane and a mixture thereof.

13. An adhesive composition according to claim 9 wherein the hydroperoxide is cumene hydroperoxide.

14. An adhesive composition comprising (A) 100 parts by weight of (1) an ethylene-vinyl acetate copolymer or (2) a combination of an ethylene-vinyl acetate copolymer and polyethylene, the vinyl acetate content in (A) being 1 to 35 percent by weight based on the total weight of said copolymer or said combination of the copolymer and polyethylene, (B) 0.05 to 200 parts by weight of at least one unsaturated carboxylic acid which is solid at normal temperature, (C) 0.005 to 10.0 parts by weight of at least one organic peroxide having a decomposition temperature as determined by 10 hour half life of greater than 60°C and (D) 0.05 to 5.0 parts by weight of at least one phenol compound.

15. An adhesive composition according to claim 14 wherein the unsaturated carboxylic acid is an aliphatic unsaturated carboxylic acid.

16. An adhesive composition according to claim 14 wherein the unsaturated carboxylic acid is an aromatic unsaturated carboxylic acid.

17. An adhesive composition according to claim 15 wherein the aliphatic unsaturated carboxylic acid is a member selected from the group consisting of crotonic acid, maleic acid, fumaric acid, itaconic acid, 2-methylene glutaric acid, citraconic acid and a mixture thereof.

18. An adhesive composition according to claim 16 wherein the aromatic unsaturated carboxylic acid is cinnamic acid.

19. An adhesive composition according to claim 14 wherein the organic peroxide is a dialkyl peroxide.

20. An adhesive composition according to claim 14 wherein the organic peroxide is a diaryl peroxide.

21. An adhesive composition according to claim 14 wherein the organic peroxide is a ketone peroxide.

22. An adhesive composition according to claim 14 wherein the organic peroxide is a hydroperoxide.

23. An adhesive composition according to claim 19 wherein the dialkyl peroxide is dicumyl peroxide.

24. An adhesive composition according to claim 20 wherein the diaryl peroxide is benzoyl peroxide.

25. An adhesive composition according to claim 21 wherein the ketone peroxide is a member selected from the group consisting of methyl ethyl ketone peroxide, 1,1-bis-tert-butyl peroxy-3,3,5-trimethylcyclohexane and a mixture thereof.

26. An adhesive composition according to claim 22 wherein the hydroperoxide is cumene hydroperoxide.

27. An adhesive composition according to claim 14 wherein the phenol compound is a monophenol compound.

28. An adhesive composition according to claim 14 wherein the phenol compound is a bisphenol compound.

29. An adhesive composition according to claim 14 wherein the phenol compound is a trisphenol compound.

30. An adhesive composition according to claim 14 wherein the phenol compound is a tetraphenol compound.

31. An adhesive composition according to claim 27 wherein the monophenol compound is a member selected from the group consisting of phenol, cresols (o-, m- or p-), xylenols, 2,6-ditert-butyl-4-methylphenol, 2,6-di-tert-butyl-4-ethylphenol, 2,6-di-tert-butyl-4-methoxyphenol, n-octadecyl-$\beta$-(4'-hydroxy-3',5'-di-tert-butylphenylpropionate, catechol hydroquinone and a mixture thereof.

32. An adhesive composition according to claim 28 wherein the bisphenol compound is a member selected from the group consisting of 2,2'-methylenebis(4-methyl-6-tert-butylphenol), 4,4'-butylidenebis(3-methyl-6-tert-butylphenol), 4,4'-thiobis(3-methyl-6-tert-butylphenol), 2,2'-thiobis (4-methyl-6-tert-butylphenol), 4,4'-dihydroxyphenylisopropane and a mixture thereof.

33. An adhesive composition according to claim 29 wherein the trisphenol compound is 1,3,5-trimethyl-2,4,6-tris (3,5-di-tert-butyl-4-hydroxy-benzyl) benzene.

34. An adhesive composition according to claim 30 wherein the tetraphenol compound is tetrakis[methylene-3-(3',5'-di-tert-butyl-4'-hydroxyphenyl)propionate]-methane.

35. An adhesive composition according to claim 1 wherein the organic peroxide is 2,5-dimethyl-2,5-dibenzoyl peroxyhexane.

36. An adhesive composition according to claim 14 wherein the organic peroxide is 2,5-dimethyl-2,5-dibenzoyl peroxyhexane.

* * * * *